US010567454B2

(12) United States Patent
Oh et al.

(10) Patent No.: US 10,567,454 B2
(45) Date of Patent: Feb. 18, 2020

(54) METHOD AND SYSTEM FOR SHARING LIVE BROADCAST DATA INCLUDING DETERMINING IF AN ELECTRONIC DEVICE IS A SEED DEVICE IN RESPONSE TO DETERMINING THE RELATIONSHIP A RANDOM VALUE HAS WITH A SETTING VALUE

(71) Applicant: NAVER Corporation, Seongnam-si, Gyeonggi-do (KR)

(72) Inventors: Jaewon Oh, Seongnam-si (KR); SeungKwan Yang, Seongnam-si (KR)

(73) Assignee: NAVER CORPORATION, Gyeonggi-do (KR)

( * ) Notice: Subject to any disclaimer, the term of this patent is extended or adjusted under 35 U.S.C. 154(b) by 242 days.

(21) Appl. No.: 15/402,578

(22) Filed: Jan. 10, 2017

(65) Prior Publication Data

US 2017/0201559 A1 Jul. 13, 2017

(30) Foreign Application Priority Data

Jan. 12, 2016 (KR) ........................ 10-2016-0003512

(51) Int. Cl.
*H04L 29/06* (2006.01)
*H04L 29/08* (2006.01)

(52) U.S. Cl.
CPC ........ *H04L 65/4076* (2013.01); *H04L 65/602* (2013.01); *H04L 67/02* (2013.01); *H04L 67/025* (2013.01); *H04L 67/04* (2013.01); *H04L 67/104* (2013.01); *H04L 67/1097* (2013.01)

(58) Field of Classification Search
CPC ..... H04L 65/4076; H04L 67/02; H04L 67/04; H04L 67/025; H04L 67/1097; H04L 67/104; H04L 65/602
See application file for complete search history.

(56) References Cited

U.S. PATENT DOCUMENTS

| 9,124,605 | B2 * | 9/2015 | Bai | H04L 65/4015 |
| 9,369,509 | B2 * | 6/2016 | Sun | H04L 67/104 |
| 2002/0090085 | A1 * | 7/2002 | Vanstone | H04L 9/0869 380/44 |
| 2002/0120838 | A1 * | 8/2002 | Abdulkader | H04L 9/12 713/153 |

(Continued)

FOREIGN PATENT DOCUMENTS

| JP | 2006060639 A | 3/2006 |
| JP | 2011045082 A | 3/2011 |

(Continued)

*Primary Examiner* — Daniel C. Murray
(74) *Attorney, Agent, or Firm* — Harness, Dickey & Pierce, P.L.C.

(57) ABSTRACT

A non-transitory computer-readable recording medium stores computer-executable instructions that, when executed by one or more processors, causes the one or more processors to perform operations including receiving, at a first electronic device, high quality live stream data through a high quality channel; playing back the high quality live stream data; receiving low quality live stream data through a low quality channel as the electronic device is set as a seed device in response to creation of the high quality channel; and sharing the received low quality live stream data by transmitting the received low quality live stream data.

17 Claims, 8 Drawing Sheets

(56) References Cited

U.S. PATENT DOCUMENTS

| | | | | |
|---|---|---|---|---|
| 2007/0223675 A1* | 9/2007 | Surin | .................. | H04L 12/1827 |
| | | | | 379/202.01 |
| 2008/0133538 A1* | 6/2008 | Chavez | ................ | H04L 67/104 |
| 2008/0133666 A1* | 6/2008 | Chavez | ................ | H04L 67/104 |
| | | | | 709/205 |
| 2008/0133698 A1* | 6/2008 | Chavez | ................ | H04L 67/104 |
| | | | | 709/217 |
| 2008/0133706 A1* | 6/2008 | Chavez | ................ | H04L 67/104 |
| | | | | 709/218 |
| 2008/0205291 A1* | 8/2008 | Li | ........................ | H04L 47/722 |
| | | | | 370/254 |
| 2009/0100128 A1* | 4/2009 | Czechowski, III | ... | H04L 67/104 |
| | | | | 709/203 |
| 2010/0017474 A1* | 1/2010 | Kandekar | .......... | H04N 7/17318 |
| | | | | 709/205 |
| 2010/0138511 A1* | 6/2010 | Guo | ........................ | H04L 47/10 |
| | | | | 709/207 |
| 2010/0146569 A1* | 6/2010 | Janardhan | .......... | H04N 7/17318 |
| | | | | 725/98 |
| 2011/0010258 A1* | 1/2011 | Chavez | ............. | G06Q 30/0283 |
| | | | | 705/26.1 |
| 2011/0010421 A1* | 1/2011 | Chavez | ............... | H04L 12/6418 |
| | | | | 709/204 |
| 2011/0046755 A1* | 2/2011 | Sung | ................ | H04N 21/43615 |
| | | | | 700/90 |
| 2011/0106965 A1 | 5/2011 | Chun et al. | | |
| 2011/0271003 A1* | 11/2011 | Bai | ..................... | H04L 65/1083 |
| | | | | 709/231 |
| 2013/0262542 A1* | 10/2013 | Tkacik | ..................... | G06F 7/58 |
| | | | | 708/250 |
| 2014/0025739 A1* | 1/2014 | Stoica | ................... | H04L 67/104 |
| | | | | 709/204 |
| 2014/0195612 A1* | 7/2014 | Guo | .................... | H04L 67/1085 |
| | | | | 709/204 |
| 2015/0180930 A1* | 6/2015 | Sun | ....................... | H04L 67/104 |
| | | | | 709/203 |
| 2017/0180341 A1* | 6/2017 | Walker | .................... | H04L 63/08 |
| 2017/0225082 A1* | 8/2017 | Suwa | ..................... | A63F 13/85 |

FOREIGN PATENT DOCUMENTS

| | | |
|---|---|---|
| JP | 2013187637 A | 9/2013 |
| JP | 2013258657 A | 12/2013 |
| KR | 2011-0046763 A | 5/2011 |
| KR | 2011-0119229 A | 11/2011 |
| KR | 2014-0024553 A | 3/2014 |
| WO | WO-2011136481 A2 | 11/2011 |

\* cited by examiner

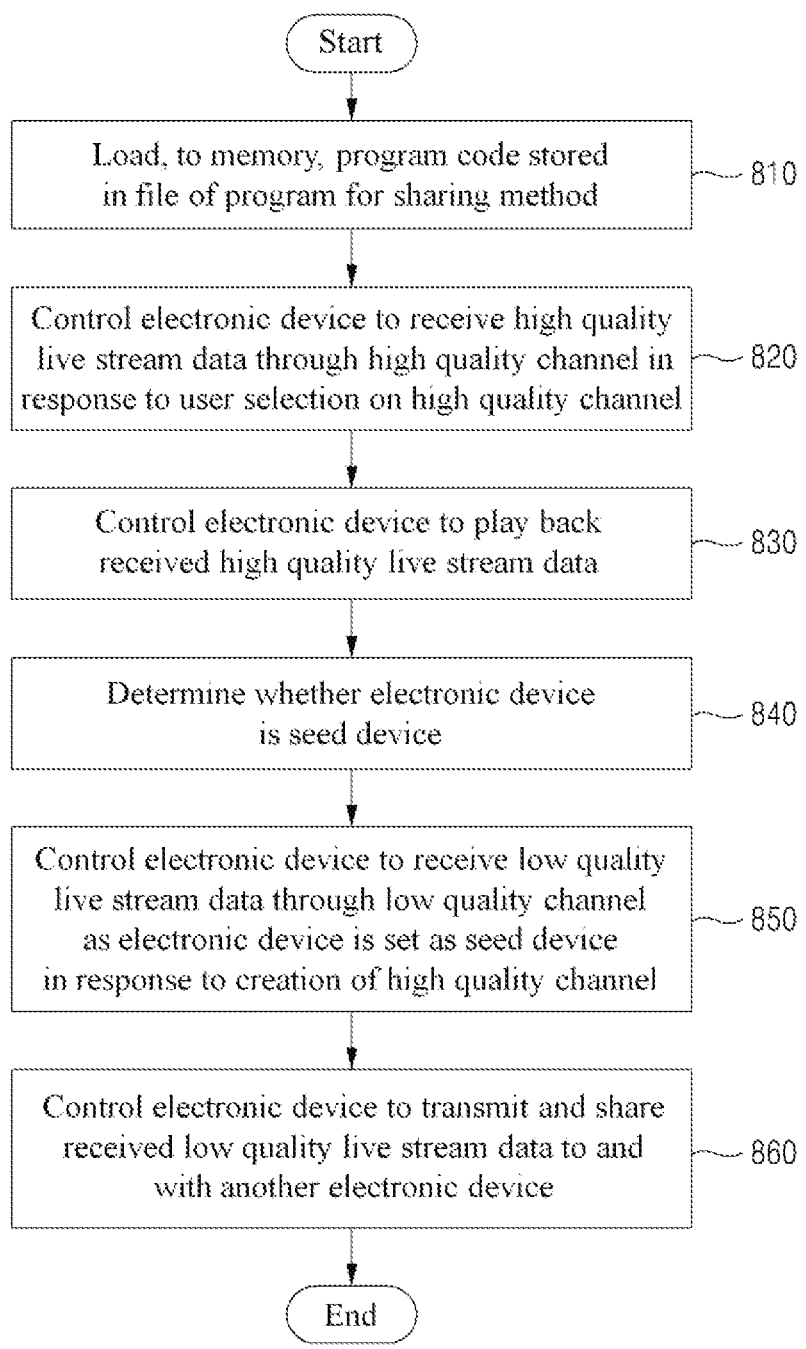

METHOD AND SYSTEM FOR SHARING LIVE BROADCAST DATA INCLUDING DETERMINING IF AN ELECTRONIC DEVICE IS A SEED DEVICE IN RESPONSE TO DETERMINING THE RELATIONSHIP A RANDOM VALUE HAS WITH A SETTING VALUE

CROSS-REFERENCE TO RELATED APPLICATION(S)

This application claims priority under 35 U.S.C. § 119 to Korean Patent Application No. 10-2016-0003512 filed on Jan. 12, 2016, in the Korean Intellectual Property Office (KIPO, the entire contents of which are incorporated herein by reference.

BACKGROUND

Field

One or more example embodiments relate to technology for sharing live broadcast data.

Description of Related Art

Data of live video content, for example, a broadcast program, may be provided through a channel for each of various qualities, such as a high quality and a low quality. A fixed electronic device, for example, a personal computer (PC), and a mobile electronic device, for example, a smartphone, a tablet, etc., operate as downloaders to download data of live video content. For example, the PC connects to a server through a local area network (LAN) or wireless network (e.g., WiFi) and downloads data of live video content generally through a high quality channel. The mobile electronic device connects to the server through WiFi or wireless communication aside from WiFi, and downloads data of live video content generally through a low quality channel. The PC and the mobile electronic device operate as uploaders to share data of live video content between clients. However, the PC may operate as the uploader only when access is made through the LAN. Also, the mobile electronic device may limitedly operate as the uploader based on a WiFi network state when access is made through WiFi.

Accordingly, a number of downloaders to be provided with data of live video content is significantly greater than a number of uploaders. Also, an increase in a number of users that are to download low quality video contents through mobile electronic devices rather than PCs increases traffic. Korean Patent Publication No. 10-2014-0024553 discloses a live streaming content transmission method and apparatus for reducing load of a content providing server.

SUMMARY

According to at least some example embodiments, a non-transitory computer-readable recording medium storing computer-executable instructions that, when executed by one or more processors, causes the one or more processors to perform operations including receiving, at a first electronic device, high quality live stream data through a high quality channel; playing back the high quality live stream data; receiving low quality live stream data through a low quality channel as the electronic device is set as a seed device in response to creation of the high quality channel; and sharing the received low quality live stream data by transmitting the received low quality live stream data.

The receiving low quality live stream data may include receiving a setting value from a server; generating a random value; and determining whether the first electronic device is the seed device based on the setting value and the random value.

The setting value may be set at the server based on a number of users for each type of a communication scheme of each of the low quality channel and the high quality channel.

The setting value may be determined at the server based on a number of users connected to the low quality channel, a number of users connected to the low quality channel through a local area network (LAN) among the number of users connected to the low quality channel, a number of users connected to the high quality channel through the LAN among a number of users connected to the high quality channel, and a LAN user ratio of the low channel quality preset at the server.

The operations may further include playing back, at the first electronic device, the received low quality live stream data in response to a user selection on the low quality channel; and suspending the sharing of the received low quality live stream data.

The receiving low quality live stream data may include receiving pieces of the low quality live stream data specified through a streaming sliding window using the streaming sliding window for specifying continuous pieces to be downloaded or played out among pieces that constitute live stream data.

The streaming sliding window may be divided into a plurality of areas, and the receiving low quality live stream data may include receiving pieces specified on a first area among the plurality of areas from a peer electronic device through a peer-to-peer (P2P) scheme.

The receiving low quality live stream data may further include receiving pieces specified using a second area among the plurality of areas from a server through a streaming scheme, and the second area may be an area for specifying pieces corresponding to relatively latest live stream data compared to other areas among pieces specified through the streaming sliding window.

According to at least some example embodiments, a sharing method includes receiving, at a first electronic device, high quality live stream data through a high quality channel; playing back the high quality live stream data; receiving, at the first electronic device, low quality live stream data through a low quality channel as the electronic device is set as a seed device in response to creation of the high quality channel; and sharing the received low quality live stream data by transmitting the received low quality live stream data.

The receiving low quality live stream data may include receiving a setting value from a server; generating a random value; and determining whether the first electronic device is the seed device based on the setting value and the random value.

The method may further include playing back, at the first electronic device, the received low quality live stream data in response to a user selection on the low quality channel; and suspending the sharing of the received low quality live stream data.

The receiving low quality live stream data may include receiving pieces of the low quality live stream data specified through a streaming sliding window using the streaming sliding window for specifying continuous pieces to be downloaded or played back among pieces that constitute live stream data.

The streaming sliding window may be divided into a plurality of areas, and the receiving low quality live stream data may include receiving pieces specified using a first area among the plurality of areas from a peer electronic device through a peer-to-peer (P2P) scheme.

The receiving low quality live stream data may further include receiving pieces specified using a second area among the plurality of areas from a server through a streaming scheme, and the second area may be an area for specifying pieces corresponding to relatively latest live stream data compared to other areas among pieces specified through the streaming sliding window.

According to at least some example embodiments of the inventive concepts, an electronic device includes memory storing computer-executable instructions; and one or more processors configured to execute the computer-executable instructions such that the one or more processors are configured to, receive high quality live stream data through a high quality channel in response to a user selection on the high quality channel, receive low quality live stream data through a low quality channel as the electronic device is set as a seed device in response to creation of the high quality channel, determine whether the electronic device is the seed device; play back the received high quality live stream data, and share the received low quality live stream data by transmitting the received low quality live stream data.

The one or more processors may be configured to execute the computer-executable instructions such that the one or more processors are configured to receive a setting value from a server; generate a random value; and determine whether the first electronic device is the seed device based on the setting value and the random value.

The one or more processors may be configured to execute the computer-executable instructions such that the one or more processors are configured to play back the received low quality live stream data in response to a user selection on the low quality channel; and suspend the sharing of the received low quality live stream data.

The one or more processors may be configured to execute the computer-executable instructions such that the one or more processors are configured to receive pieces of the low quality live stream data specified through a streaming sliding window using the streaming sliding window for specifying continuous pieces to be downloaded or played back among pieces that constitute live stream data.

The one or more processors may be configured to execute the computer-executable instructions such that the one or more processors are configured such that, the streaming sliding window is divided into a plurality of areas, and the receiving low quality live stream data includes receiving pieces specified on a first area among the plurality of areas from a peer electronic device through a peer-to-peer (P2P) scheme The one or more processors may be configured to execute the computer-executable instructions such that the one or more processors are configured such that the receiving low quality live stream data includes receiving pieces specified using a second area among the plurality of areas from a server through a streaming scheme, and the second area is an area for specifying pieces corresponding to relatively latest live stream data compared to other areas among pieces specified through the streaming sliding window.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 8 is a flowchart illustrating an example of a sharing method performed at an electronic device according to at least one example embodiment.

DETAILED DESCRIPTION

Figure 1:
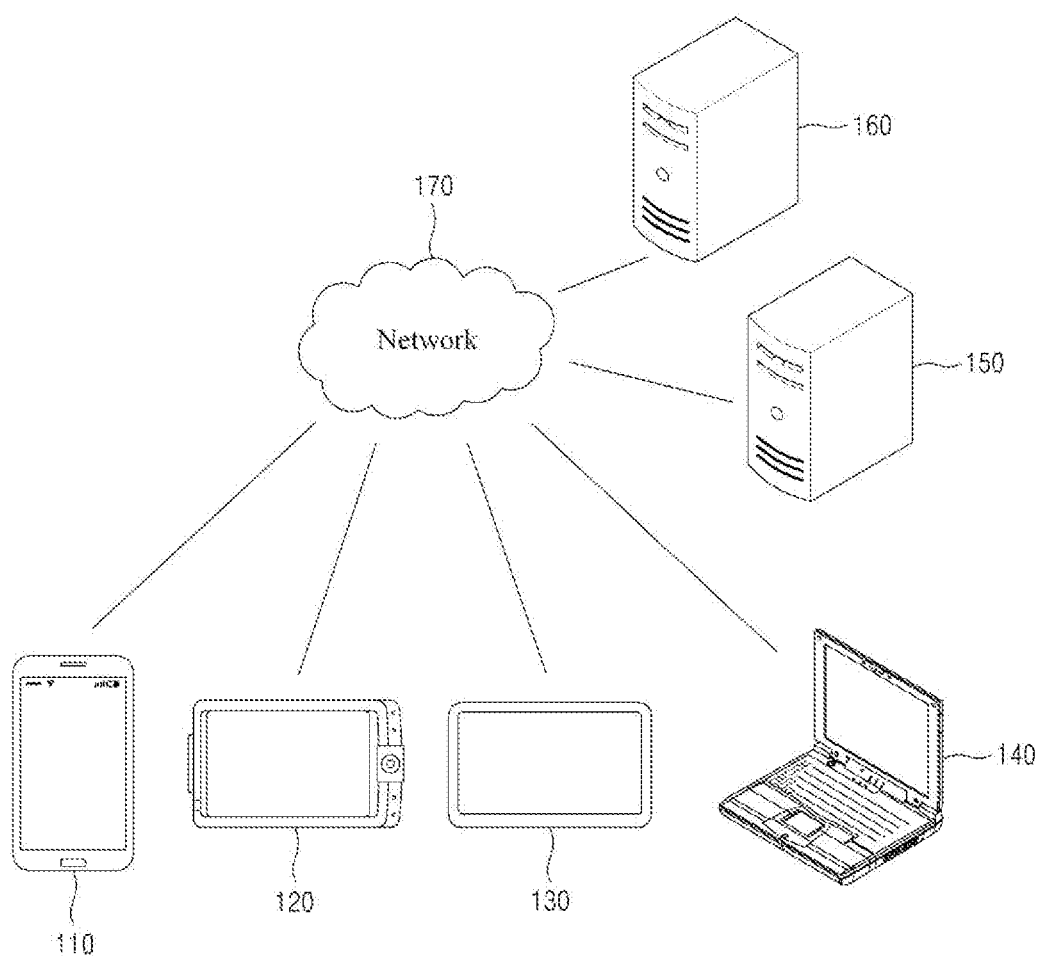
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing one or more example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of one or more example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

One or more example embodiments may be applicable to a system that may download stream data, such as live stream data, and may play back the downloaded stream data on an electronic device, such as a smartphone, a tablet, etc., in real time. In particular, one or more example embodiments may enhance a sharing rate by determining electronic devices for sharing low quality stream data as seeds for mobile live broadcast, and by broadcasting low quality stream data downloaded through the seeds to another electronic device. Herein, the term "stream data" may indicate live stream data for live broadcasting of, for example, baseball, a soccer, a game, etc. Also, the sharing rate may indicate a rate at which pieces of the stream data are shared between peers using all of a streaming scheme for live broadcast and a peer-to-peer (P2P) scheme for providing stream data by sharing data between clients. Herein, the terms "piece" or "pieces" used with respect to data refer to units (e.g., portions, fragments, chunks and/or packets) of data.

In one or more example embodiments, an electronic device that selects a high quality channel may be determined as a seed device to share low quality stream data with another electronic device. The electronic device that operates as the seed device may receive low quality stream data generally using a P2P scheme through a low quality channel and may share the low quality stream data with other electronic devices, thereby enhancing a sharing rate in a mobile live broadcast environment. According to at least some example embodiments, high quality stream data refers to high definition (HD) quality stream data or greater. Examples of data formats and/or resolutions for HD quality video data include, for example, 720p: 1280×720p, 1080i: 1920×1080i, and 1080p: 1920×1080p. According to at least some example embodiments, low quality stream data refers to stream data having a quality level below that of HD including, for example, video data of standard definition (SD) quality. According to at least some example embodiments, stream data corresponding to video data having resolutions of 1280×720p and above is considered high quality stream data, and stream data corresponding to video data having resolutions below 1280×720p is considered low quality.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, one or more example embodiments are not limited to the number of electronic devices and/or the number of servers shown in the example provided by FIG. 1.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and/or 140, and/or the servers 150 and 160 over the network 170 in a wired communication manner or in a wireless communication manner.

The communication scheme is not particularly limited and may include a communication method that uses a near field communication (NFC) between devices as well as a communication method using a communication network, for example, a mobile communication network, a wired network for accessing the Internet, a wireless network (e.g., WiFi) for accessing the Internet, and a broadcasting network, which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, one or more example embodiments are not limited to the examples of communication methods and network topologies discussed above.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. Also, the server 160 may connect to the server 150 under control of at least one program, for example, a browser or the installed application, an operating system (OS) included in the electronic device 110, and may use a service or content provided from the server 150. For example, in response to a service request message transmitted from the electronic device 110 to the server 150 over the network 170 under control of the application, the server 150 may transmit a code corresponding to the service request message to the electronic device 110, and the electronic device 110 may provide content to the user by configuring and displaying a screen corresponding to the code under control of the application. As another example, the server 150 may set a communication session for a messaging service and may route a message transmission and reception between the plurality of electronic devices 110, 120, 130, and/or 140 through the set communication session. As another example, the server 150 may provide a social network service to the electronic devices 110, 120, 130, and/or 140. Also, the servers 150 and/or 160 may provide a live streaming service to the plurality of electronic devices 110, 120, 130, and/or 140.

Figure 2:
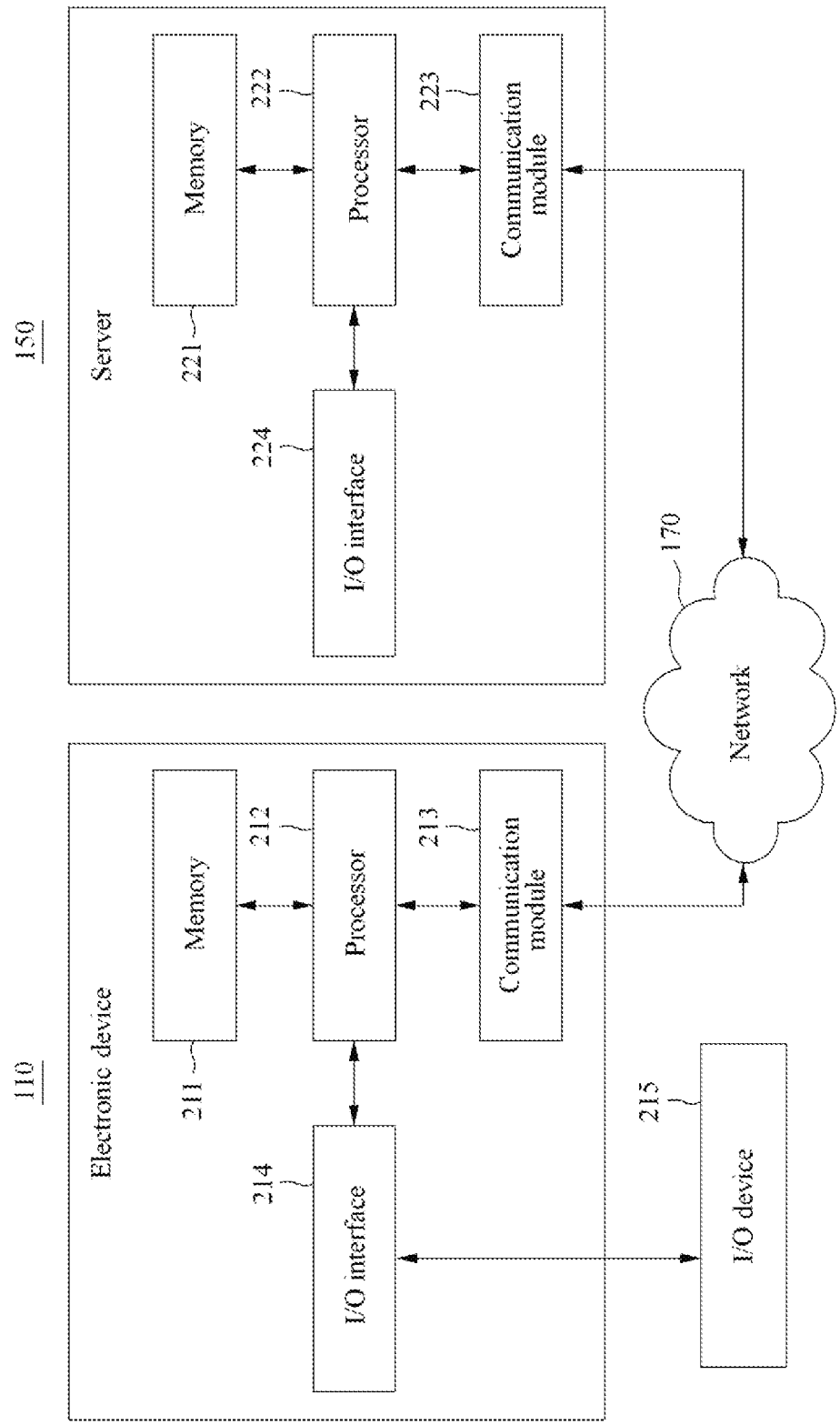
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar constituent elements may be applicable to other electronic devices 120, 130, and 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), read only memory (ROM), a disk drive, etc., as a computer-readable storage medium. Also, an OS and at least one program code, for example, a code for the aforementioned browser or the application installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a streaming service request for content, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. However, there is no need to clearly illustrate many constituent elements according to the related art. For example, the electronic device 110 may include at least a portion of the I/O device 215, or may further include other constituent elements, for example, a transceiver, a global positioning system (GPS) module, a camera, a variety of sensors, a database, and the like.

Figure 3:
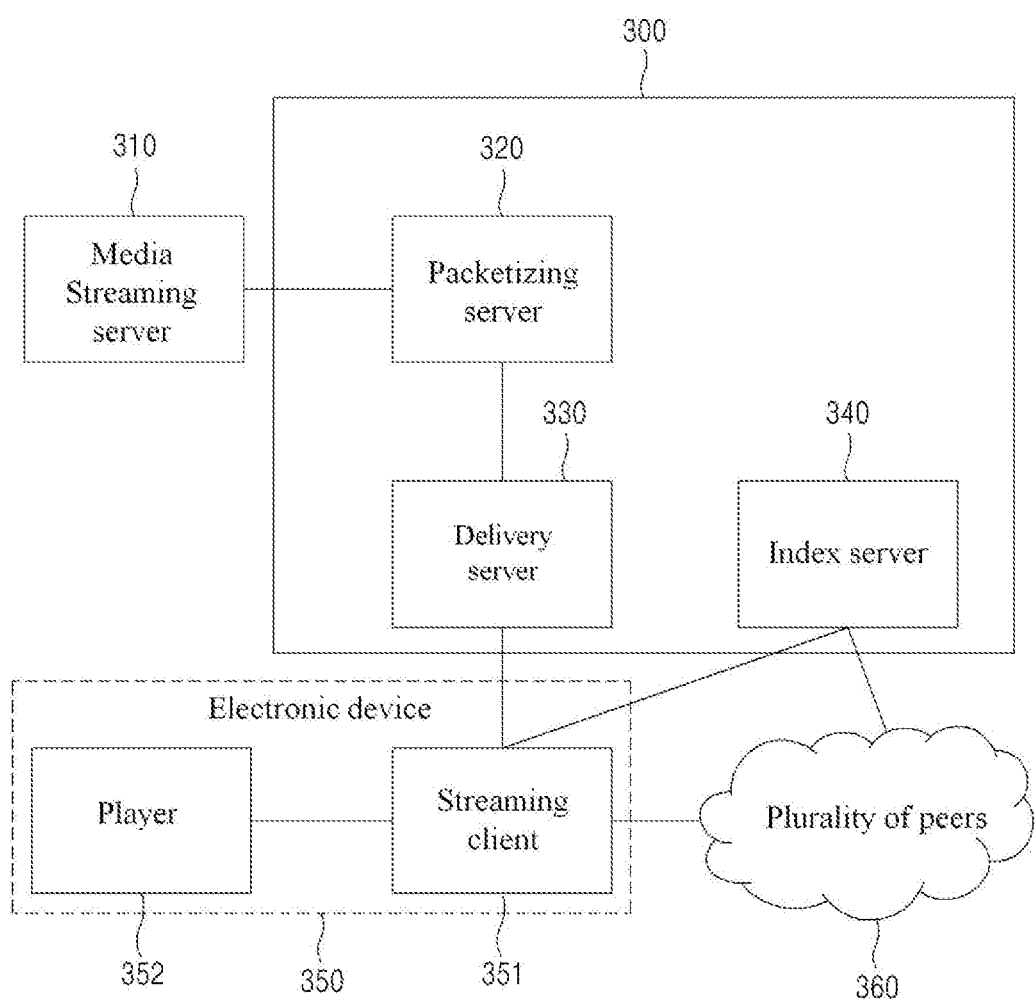
FIG. 3 is a diagram illustrating an example of an entire system environment for a live streaming service according to at least one example embodiment.

FIG. 3 is a diagram illustrating an example of an entire system environment for a live streaming service according to at least one example embodiment. FIG. 3 illustrates a media streaming server 310, a packetizing server 320, a delivery server 330, an index server 340, an electronic device 350, and a plurality of peers 360. The packetizing server 320, the delivery server 330 and an index server 340 are included in a server-side system 300 providing the live streaming service.

Each of the media streaming server 310, the packetizing server 320, the delivery server 330, and the index server 340 may be a device that includes constituent elements same as or, alternatively, similar to those of the server 150 described with FIGS. 1 and 2. Also, each of the plurality of peers 360 and the electronic device 350 may be a device that includes constituent elements same as or, alternatively, similar to those of the electronic device 110 described above with FIGS. 1 and 2. Although FIG. 3 illustrates an arrangement including only one of each of the media streaming server 310, the packetizing server 320, the delivery server 330, and the index server 340, the arrangement shown in FIG. 3 is one example. According to one or more example embodiments, each of the media streaming server 310, the packetizing server 320, the delivery server 330, and the index server 340 may be configured in a form of a group that includes a plurality of servers. For example, in the case of live broadcasting a professional baseball game, if four games are ongoing, four groups of media streaming servers for four media sources may be present with respect to four games, respectively, and four groups of packetizing servers may be present for four media sources, respectively. Similarly, the delivery server 330 and the index server 340 may be configured as a plurality of server groups if necessary. For example, in the case of the delivery server 330 and the index server 340, a number of servers required may be determined based on performance issues, such as a number of users that simultaneously connect to a server.

The media streaming server 310 may be a media source device that includes an encoder (not shown) configured to provide live stream data. The packetizing server 320 may receive live stream data from the media streaming server 310, and may packetize or index the received live stream data to a piece in order to provide the received live stream data through a P2P service. According to one or more example embodiments, the packetizing server 320 may packetize and/or index stream data in accordance with one or more known methods for packetizing and/or indexing stream data.

The delivery server 330 may receive the packetized or indexed piece from the packetizing server 320, and may buffer the received piece, and may transmit the piece associated with the requested live stream data to a corresponding peer in response to the request from the peer using the P2P service. Here, the peer may indicate a client in a live streaming service using the P2P service, and may be configured as a single electronic device. The peer may be an electronic device, (e.g., the electronic device 350 of FIG. 3), and may be a device that includes constituent elements the same as or, alternatively, similar to those of the electronic device 110 described above with FIGS. 1 and 2. An electronic device that is a peer may also be referred to herein as a peer electronic device.

The index server 340 may maintain a list of peers and may provide a search result in response to a request from the peer (e.g. the electronic device 350). The index server 340 may provide a setting value of a channel having set a communication session with the electronic device 350 to the electronic device 350, in order to provide live stream data to the electronic device 350. Here, the setting value of the channel is a probability value and may represent a ratio of active download, as is discussed in greater detail below with respect to Table 1.

The same application as one installed on a streaming client 351 may be installed and executed on the peer (e.g., the electronic device 350). Here, the electronic device 350 may receive a piece from the delivery server 330 or may receive a piece from other peers (e.g., other electronic devices from among the plurality of peers 360 of FIG. 3), under control of the streaming client 351 executed on the electronic device 350.

Also, the streaming client 351 executed on the electronic device 350 may transmit live stream data to a player 352, which is another application installed and executed on the electronic device 350, through internal communication within the electronic device 350. Here, live stream data provided from the streaming client 351 to the player 350 may be data combined based on pieces received from the delivery server 330 and at least a portion of the plurality of peers 360.

In one example, the player 352 may play back live stream data provided from the streaming client 351. Accordingly, live stream data provided from the media streaming server 310 may be played back at the electronic device 350 and provided to a user of the electronic device 350. For example, the streaming client 351 may stream a live broadcast video to the player 352 using pieces stored in a memory, for example, the memory 211 of FIG. 2.

Here, a streaming sliding window may be used to specify pieces to be transmitted to the player 352. The streaming sliding window will be further described below, for example, with reference to FIG. 4.

A streaming client, for example, the streaming client 351 of FIG. 3, installed and executed on an electronic device, for example, the electronic device 350 of FIG. 3, that is a peer may provide an active download mode associated with live stream data to a user of the electronic device. The active download mode may represent an operating mode for controlling an electronic device determined as a seed device to download low quality live stream data together with high quality live stream data, and to operate as a seed for sharing the downloaded low quality live stream data with another electronic device having requested the low quality live stream data. For example, an electronic device, such as a PC, etc., using high quality live stream data through a local area n (LAN) may be selected as a seed and may provide low quality live stream data to a mobile electronic device, such as a smartphone, a tablet, etc. That is, a seed device may operate as an uploader that shares the low quality live stream data with another electronic device. Here, the seed device may receive and play back high quality live stream data for playback using at least one of a streaming scheme through a server and a P2P scheme through other peers. On the contrary, low quality live stream data for sharing may be received and transmitted to another electronic device using the P2P scheme, and may thereby be shared. Here, a portion of the low quality live stream data, for example, relatively latest live stream data may be received from the server and shared. The streaming sliding window may be used to share the low quality live stream data, which will be described below for example, with reference to FIG. 4.

Figure 4:
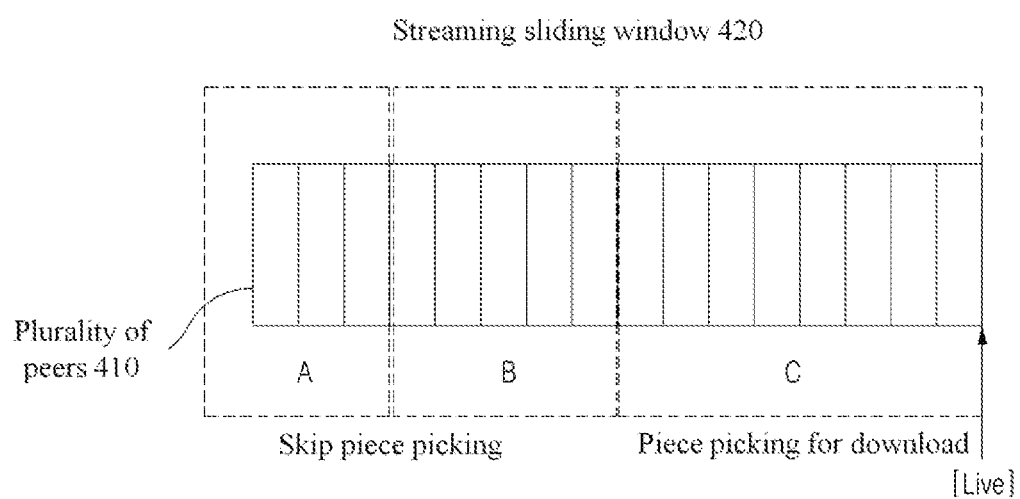
FIG. 4 illustrates an example of a streaming sliding window according to at least one example embodiment.

FIG. 4 illustrates an example of a streaming sliding window according to at least one example embodiment. To share low quality live stream data through an active download mode associated with live stream data, a seed device may receive pieces of the low quality live stream data. Referring to FIG. 4, a plurality of pieces 410 to be received for sharing may be specified through a streaming sliding window 420 on the seed device. A piece relatively close to "[Live]" among pieces specified through the streaming sliding window 420 may be a piece for latest live stream data.

Here, the seed device may receive, from other peers using a P2P scheme, pieces specified on a first area, for example, area A and area B of FIG. 4, among the plurality of pieces 410 specified through the streaming sliding window 420. The "Skip piece picking" associated with the area A and area B of FIG. 4, means the pieces specified on the first area received from other peers using the P2P scheme without downloading from the server, for example, the delivery server 330. The seed device has already received and been playing back high quality live stream data. Further, low quality live stream data is received for sharing, not for playback. Thus, a need for directly downloading from the server, for example, the delivery server 330 is relatively low. Meanwhile, a second area, for example, an area C of FIG. 4, of the streaming sliding window 420, is to receive pieces of latest live stream data. Thus, pieces specified on the second area may be received from the server using a streaming scheme according to a preset policy of the server. The "Piece picking for download" associated with the area C of FIG. 4, means the pieces specified on the second area received from the server. Accordingly, the seed device may quickly collect pieces associated with the latest live stream data and may share the collected pieces with other peers.

Figure 5:
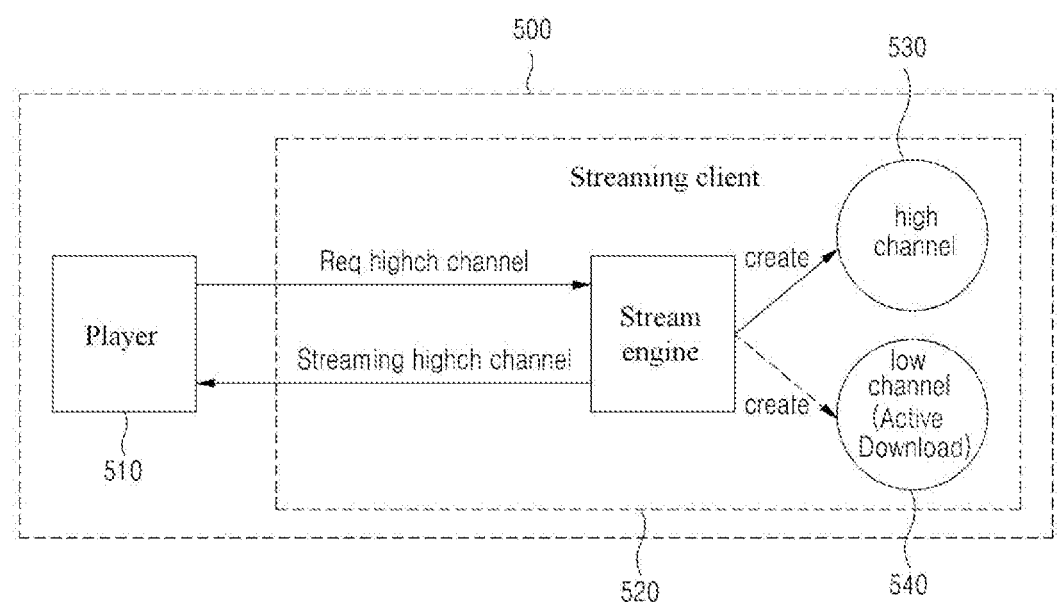
FIG. 5 illustrates an example of creating a channel for an operation in an active download mode according to at least one example embodiment.

FIG. 5 illustrates an example of creating a channel for an operation in an active download mode according to at least one example embodiment.

Referring to FIG. 5, a player 510 of an electronic device 500 may request a streaming client 520 for high quality live stream data. For example, a user of the electronic device 500 may select a resolution, for example, a high quality, a low quality, etc., of live stream data to receive live through the player 510. The streaming client 520 may create a high quality channel 530 and may receive high quality live stream data through the high quality channel 530. Here, the high quality live stream data may be received through a general transmission scheme that uses all of a streaming scheme from the server-side system 300 and a P2P scheme from the plurality of peers 360, through the high quality channel 530.

In response to a selection on the high quality channel 530, the index server 340 of FIG. 3 may transfer a setting value of the high quality channel 530 to the electronic device 500, and the electronic device 500 may determine whether the electronic device 500 is a seed device based on the transferred setting value and a random value that is created at the electronic device 500 under control of the streaming client 351. When the electronic device 500 is determined as the seed device, the electronic device 500 may create an active download mode for low quality live stream data.

For example, if the random value is less than the setting value, the electronic device 500 may execute the active download mode, and may share low quality live stream data through transmission and reception thereof. The above process may be performed according to an algorithm of Table 1.

TABLE 1

1. An electronic device having selected a high quality channel receives an active download ratio as a setting value C for each channel from an index server.
Value: float (min: 0.0, max: 100.0, default: 0.0)
2. The electronic device creates a random value r between 0 and 99.9 when creating the high quality channel.
3. If the random value r is less than the setting value C, the electronic device is determined as a seed device and active download mode is set.

The active download ratio transferred as the setting value C may be set or, alternatively, preset at the index server 340 or the server-side system 300 that includes the index server 340 based on a number of users for each type of a communication scheme of each of a low quality channel 540 and the high quality channel 530. Here, the type of the communication scheme may indicate a communication scheme, such as a LAN, WiFi, etc.

In detail, the index server 340 or the server-side system 300 may calculate the active download ratio based on a number of users connected to the low quality channel 540, a number of users connected to the low quality channel 540 through a LAN among users of the low quality channel 540, a number of users connected to the high quality channel 530 through the LAN among users of the high quality channel 530, and a LAN user ratio of the low quality channel 540 set to a desired value or, alternatively, preset at the server, for example, the index server 340 or the server-side system 300.

For example, it is assumed that the number of users connected to the low quality channel 540 is s, the number of users connected to the low quality channel 540 through the LAN among the users of the low quality channel 540 is a, the number of users connected to the high quality channel 530 through the LAN among the users of the high quality channel 530 is b, and the LAN user ratio of the low quality channel 540 set to a desired value or, alternatively, preset at the server, for example, the index server 340 or the server-side system 300 is k. Here, each of a, b, and s denotes a natural number and k denotes a positive rational number. In this case, the index server 340 or the server-side system 300 may calculate the active download ratio according to Equation 1.

$$d = \frac{(s \times k - a)}{1 - k}$$
$$x = \frac{d}{b} = \frac{(s \times k - a)}{b(1 - k)}$$
[Equation 1]

In Equation 1, x denotes the active download ratio, and k denotes a desired or, alternatively, preset system setting constant and may represent a maintenance ratio of low quality LAN users to total users. A number of LAN user insufficient for the ratio of k, that is, the number of users connected to the low quality channel 540 through the LAN, may be determined. For example, k may be set or, alternatively, predefined to have a value of a/b or less and may be gradually changed based on a network situation. That is, k may be set or, alternatively, predefined so that the number of LAN users of the low quality channel 540 is less than or equal to the number of LAN users of the high quality channel 530.

An active download ratio for each channel calculated at the index server 340 may be used as a setting value of each channel. That is, the active download ratio may be a probability value for using a portion of electronic devices, for example, PCs using the LAN, using the high quality channel 530 as seed devices. When the electronic device 500 having requested live stream data through the high quality channel 530 is determined as a seed device, the streaming client 520 may create the high quality channel 530 for high quality live stream data and the low quality channel 540 for low quality live stream data together. As described above, the high quality channel 530 may be a download channel for receiving the high quality live stream data to be played back at the electronic device 500. Also, the low quality channel 540 may be a download channel for receiving low quality live stream data so that the electronic device 500 may share the low quality live stream data with other peers as a seed device.

Once the electronic device 500 is determined as the seed device, an active download mode is set, and the high quality channel 530 and the low quality channel 540 may be created. Here, the electronic device 500 may download the plurality of pieces 410 specified through the streaming sliding window 420 of FIG. 4. As described above, the low quality live stream data may be received through other peers generally using the P2P scheme. Pieces specified on a second area, for example, the area C of FIG. 4, of the streaming sliding window 420 may be provided from the server-side system 300 using the streaming scheme.

Accordingly, from perspective of the server-side system 300, a sharing rate of pieces between peers may be enhanced through pieces uploaded to the seed device through the low quality channel 540 without using separate server traffic.

Figure 6:
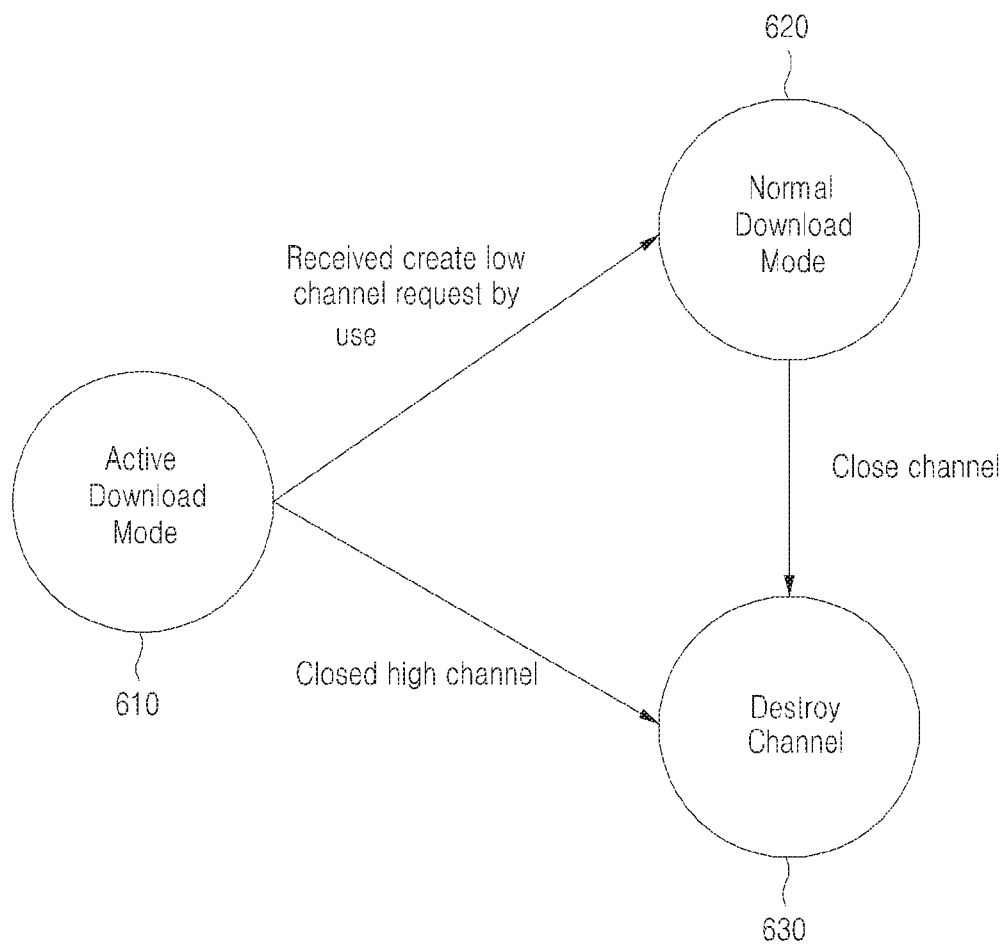
FIG. 6 illustrates an example of changing an operation mode in response to an electronic device being determined as a seed device according to at least one example embodiment.

FIG. 6 illustrates an example of changing an operation mode in response to an electronic device being determined as a seed device according to at least one example embodiment.

Referring to FIG. 6, an operation mode of the electronic device 500 may be classified into an active download mode 610 and a normal download mode 620 under control of the streaming client 520.

When the player 510 requests the streaming client 520 for the high quality channel 530 and the electronic device 500 is determined as a seed device, the operation mode of the electronic device 500 may be set to the active download mode 610 and accordingly, the high quality channel 530 and the low quality channel 540 may be created. That is, the active download mode 610 for controlling the electronic device 500 to operate as a seed for sharing low quality live stream data with a plurality of peers having requested low quality data through the low quality channel 540.

Here, when a user changes a resolution to a low quality and selects the low quality through the player 510 while displaying, that is, playing back high quality live stream data on a display of the player 510, the player 510 may request the streaming client 520 for data of the low quality channel 540. In response thereto, the streaming client 520 may change the operation mode from the active download mode 610 to the normal download mode 620, and may provide the low quality live stream data to the player 510. The streaming client 520 may download low quality live stream data while downloading high quality live stream data. Thus, the streaming client 520 may switch only the operation mode from the active download mode 610 to the normal download mode 620.

As described above, although the user selects the resolution as the high quality through the player 510 in the normal download mode 620, the electronic device 500 may not operate as the seed device. Thus, when the operation mode is the normal download mode 620, the operation mode may not be switched from the normal download mode 620 to the active download mode 610. For example, when the high quality is selected again in the normal download mode 610, the electronic device 500 may determine again whether the electronic device 500 is the seed device. When the electronic device 500 is set as the seed device, the active download mode 610 may be set.

In response to close of a channel in the active download mode 610 or in the normal download mode 620, the channel may be destroyed 630.

In FIG. 6, only when the resolution is changed from the high quality to the low quality in response to a user selection, the operation mode is changed from the active download mode 610 to the normal download mode 620. It is provided as an example only and thus, the operation mode may be adaptively changed based on a desired or, alternatively, predetermined probability value, for example, a setting value for each channel, that varies based on a network environment of the server-side system 300. For example, if an amount of network traffic is greater than or equal to a desired or, alternatively, predefined reference amount of traffic, the operation mode may be changed from the active download mode 610 to the normal download mode 620 although the user does not select a resolution from the high quality to the low quality. If the network traffic becomes again to be less than the reference traffic, the operation mode may be automatically changed from the normal download mode 620 to the active download mode 610.

In a P2P service, according to an increase in a number of peers having the same piece, a sharing rate of the piece may increase. That the sharing rate is high indicates that a peer not having the corresponding piece may further easily acquire the piece through another peer at the P2P service. That is, a number of peers having latest data may increase according to an increase in the number of users using the active download mode 610. Thus, a sharing rate of pieces associated with low quality live stream data between the plurality of peers 360 may increase and server traffic cost may decrease.

Figure 7:
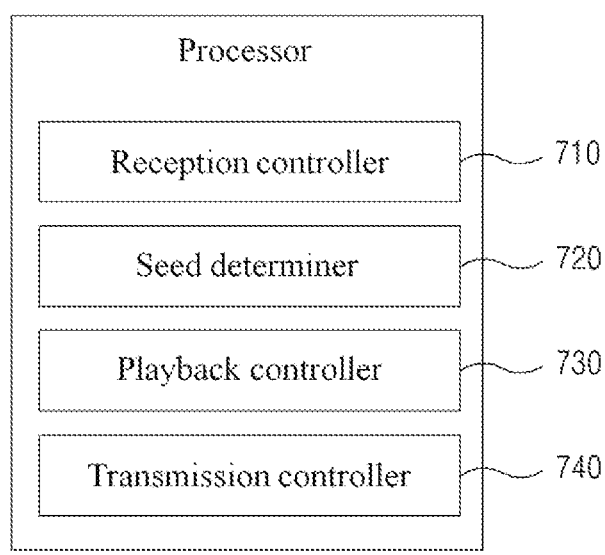
FIG. 7 is a diagram illustrating an example of constituent elements includable in a processor of an electronic device according to at least one example embodiment.

FIG. 7 is a diagram illustrating an example of constituent elements includable in a processor of an electronic device according to at least one example embodiment, and FIG. 8 is a flowchart illustrating an example of a sharing method performed at electronic device according to at least one example embodiment.

Referring to FIG. 7, the processor 212 of the electronic device 110 may include a reception controller 710, a seed determiner 720, a playback controller 730, and a transmission controller 740 as constituent elements. The processor 212 and the constituent elements of the processor 212 may control the electronic device 110 to perform operations 810 through 860 included in the sharing method of FIG. 8. Here, the processor 212 and the constituent elements of the processor 212 may be configured to execute instructions according to a code of at least one program and a code of an OS included in the memory 211. Here, the constituent elements of the processor 212 may be representations of different functions performed at the processor 212. For example, a seed determiner 720 may be used as a functional representation of an operation of the processor 212 that controls the electronic device 110 to determine whether the electronic device 110 is a seed device according to the instruction.

In operation 810, the processor 212 may load, to the memory 211, a program code that is stored in a file of a program for the sharing method. For example, in response to an execution of the program installed on the electronic device 110, the processor 212 may control the electronic device 110 to load a program code from the file of the program to the memory 211. For example, the program may be an application for the streaming client 520.

Here, the processor 212 and the reception controller 710, the seed determiner 720, the playback controller 730, and the transmission controller 740 included in the processor 212 may perform operations 820 through 860 after performing a portion, for example, an instruction, corresponding to the program code loaded to the memory 211. That is, the processor 212 and the constituent elements of the processor 212 may control the electronic device 110 to perform operations 820 through 860. For example, the processor 212 may control the communication module 213 included in the electronic device 110 so that the electronic device 110 may communicate with another electronic device or a server, for example, the server 150.

In operation 820, the reception controller 710 may control the electronic device 110 to receive high quality live stream data through a high quality channel in response to a user selection on the high quality channel. For example, in response to a user selection on the high quality live stream data through a player, for example, the player 510 of FIG. 5, the player 510 may request the streaming client 520 for data of the high quality channel. Here, the reception controller 710 may receive the high quality live stream data from a deliver server, for example, the delivery server 330 of FIG. 3 through the high quality channel. Also, the reception controller 710 may receive the high quality live stream data from other peers through a P2P scheme.

In operation 830, the playback controller 730 may control the electronic device 110 to play back the received high quality live stream data.

In operation 840, the seed determiner 720 may determine whether the electronic device 110 is a seed device. Once the high quality channel is created, the seed determiner 720 may determine whether the electronic device 110 is the seed device by comparing a random value and a setting value set at the server, for example, the index server 340 or the server-side system 300, within a desired or, alternatively, preset range for the high quality channel. The random value may be randomly created at the seed determiner 720 within the desired or, alternatively, preset range.

The setting value may be set to a desired value or, alternatively, preset at the server based on, for example, a number of users for each type of a communication scheme of each of a low quality channel and the high quality channel. As another example, the setting value may be calculated at the server based on a number of users connected to the low quality channel, a number of users connected to the low quality channel through a LAN among users of the low quality channel, a number of users connected to the high quality channel through the LAN among users of the high quality channel, and a LAN user ratio of the low quality channel that is set to desired value or, alternatively, preset at the server. Examples of calculating the setting value are described with reference to Equation 1.

In operation 850, the reception controller 710 may control the electronic device 110 to receive low quality live stream data through the low quality channel as the electronic device 110 is set as the seed device in response to creation of the high quality channel. Reception of the low quality live stream data may be performed using a streaming sliding window for specifying continuous pieces to be downloaded or played back among pieces that constitute live stream data. For example, the reception controller 710 may receive pieces of the low quality live stream data specified through the streaming sliding window. As described above, the low quality live stream data may be received from other peers through the P2P scheme and may also be selectively received from the server through a streaming scheme based on a policy of the server.

For example, the streaming sliding window may be divided into a plurality of areas. Here, in operation 850, the reception controller 710 may receive pieces specified on a first area among the plurality of areas from the other peer. Also, the reception controller 710 may receive pieces specified on a second area among the plurality of areas from the server through the streaming scheme based on the desired or, alternatively, preset policy of the server. Here, the second area may be an area that is set to desired value or, alternatively, preset to specify pieces corresponding to relatively latest live stream data compared to other areas among the pieces specified through the streaming sliding window.

In operation 860, the transmission controller 740 may control the electronic device 110 to transmit and share the received low quality live stream data to and with another electronic device. As described above, the P2P scheme may depend on a number of uploaders that upload the corresponding pieces. In one or more example embodiments, by assigning an uploader function to a portion of downloaders using the high quality channel as seeds with respect to low quality live stream data, it is possible to reduce or, alternatively, minimize the effect against network traffic of the server and to increase a sharing rate of the low quality live stream data.

Also, the playback controller 730 may control the electronic device 110 to play back the low quality live stream data received through the low quality channel in response to a user selection on the low quality channel. For example, during playback of the high quality live stream data received through the high quality channel, the user may change a resolution from a high quality to a low quality. In this case, the playback controller 730 may immediately play back low quality live stream data being received through the low quality channel.

Here, the transmission controller 740 may control the electronic device 110 to suspend transmission and sharing of the low quality live stream data to and with the other electronic device. As described above with FIG. 6, it may indicate that the operation mode is switched from the active download mode 610 to the normal download mode 620.

Description not made in FIGS. 7 and 8 may refer to the description made above with reference to FIGS. 1 through 6.

According to some example embodiments, it is possible to use an electronic device using a high quality channel as a seed providing low quality live stream data by controlling the electronic device downloading high quality live stream data through the high quality channel to download and upload low quality live stream data through a low quality channel and to upload the downloaded low quality live stream data to another electronic device. According to some example embodiments, it is possible to decrease traffic of a server providing live stream data and to enhance a playback quality with an increase in a number of seeds providing low quality live stream data. According to some example embodiments, it is possible to increase a number of mobile electronic devices to download low quality live stream data due to a decrease in traffic of a server providing live stream data and enhancement in a playback quality.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

One or more example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are designed to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. A non-transitory computer-readable recording medium storing computer-executable instructions that, when executed by one or more processors, causes the one or more processors to perform operations including:
   receiving, at a first electronic device, high quality live stream data through a high quality channel;
   playing back the high quality live stream data;
   receiving, at the first electronic device, a setting value from a server;
   generating, at the first electronic device, a random value;
   determining, at the first electronic device, whether the first electronic device is a seed device based on the setting value and the random value;
   receiving, at the first electronic device, low quality live stream data through a low quality channel as the first electronic device is set as the seed device in response to creation of the high quality channel; and
   sharing the received low quality live stream data by transmitting the received low quality live stream data, wherein the determining includes,
       determining the first electronic device is a seed device in response to determining the random value has a first relationship with the setting value, and
       determining the first electronic device is not a seed device in response to determining the random value has a second relationship with the setting value, the second relationship being different than the first relationship.

2. The non-transitory computer-readable recording medium of claim 1, wherein the setting value is set at the server based on a number of users for each type of a communication scheme of each of the low quality channel and the high quality channel.

3. The non-transitory computer-readable recording medium of claim 1, wherein the setting value is determined at the server based on a number of users connected to the low quality channel, a number of users connected to the low quality channel through a local area network (LAN) among the number of users connected to the low quality channel, a number of users connected to the high quality channel through the LAN among a number of users connected to the high quality channel, and a LAN user ratio of the low channel quality preset at the server.

4. The non-transitory computer-readable recording medium of claim 1, wherein the operations further include:
   playing back, at the first electronic device, the received low quality live stream data in response to a user selection on the low quality channel; and
   suspending the sharing of the received low quality live stream data.

5. The non-transitory computer-readable recording medium of claim 1, wherein the receiving low quality live stream data comprises:
   receiving pieces of the low quality live stream data specified through a streaming sliding window using the streaming sliding window for specifying continuous pieces to be downloaded or played out among pieces that constitute live stream data.

6. The non-transitory computer-readable recording medium of claim 5, wherein,
   the streaming sliding window is divided into a plurality of areas, and
   the receiving low quality live stream data comprises:
       receiving pieces specified on a first area among the plurality of areas from a peer electronic device through a peer-to-peer (P2P) scheme.

7. The non-transitory computer-readable recording medium of claim 6, wherein,
   the receiving low quality live stream data further comprises:
       receiving pieces specified using a second area among the plurality of areas from a server through a streaming scheme, and
   the second area is an area for specifying pieces corresponding to latest live stream data compared to other areas among pieces specified through the streaming sliding window.

8. A sharing method comprising:
   receiving, at a first electronic device, high quality live stream data through a high quality channel;
   playing back the high quality live stream data;

receiving, at the first electronic device, a setting value from a server;
generating, at the first electronic device, a random value;
determining, at the first electronic device, whether the first electronic device is a seed device based on the setting value and the random value;
receiving, at the first electronic device, low quality live stream data through a low quality channel as the first electronic device is set as the seed device in response to creation of the high quality channel; and
sharing the received low quality live stream data by transmitting the received low quality live stream data,
wherein the determining includes,
   determining the first electronic device is a seed device in response to determining the random value has a first relationship with the setting value, and
   determining the first electronic device is not a seed device in response to determining the random value has a second relationship with the setting value, the second relationship being different than the first relationship.

9. The method of claim 8, further comprising:
playing back, at the first electronic device, the received low quality live stream data in response to a user selection on the low quality channel; and
suspending the sharing of the received low quality live stream data.

10. The method of claim 8, wherein the receiving low quality live stream data comprises:
receiving pieces of the low quality live stream data specified through a streaming sliding window using the streaming sliding window for specifying continuous pieces to be downloaded or played back among pieces that constitute live stream data.

11. The method of claim 10, wherein,
the streaming sliding window is divided into a plurality of areas, and
the receiving low quality live stream data comprises:
   receiving pieces specified using a first area among the plurality of areas from a peer electronic device through a peer-to-peer (P2P) scheme.

12. The method of claim 11, wherein the receiving low quality live stream data further comprises:
receiving pieces specified using a second area among the plurality of areas from a server through a streaming scheme, and
the second area is an area for specifying pieces corresponding to latest live stream data compared to other areas among pieces specified through the streaming sliding window.

13. A first electronic device comprising:
memory storing computer-executable instructions; and
one or more processors configured to execute the computer-executable instructions such that the one or more processors are configured to,
   receive high quality live stream data through a high quality channel in response to a user selection on the high quality channel,
   receive, at the first electronic device, a setting value from a server,
   generate, at the first electronic device, a random value,
   determine, at the first electronic device, whether the first electronic device is a seed device based on the setting value and the random value,
   receive low quality live stream data through a low quality channel as the first electronic device is set as the seed device in response to creation of the high quality channel,
   play back the received high quality live stream data, and
   share the received low quality live stream data by transmitting the received low quality live stream data,
wherein the one or more processors are further configured to execute the computer-executable instructions such that the determining includes,
   determining the first electronic device is a seed device in response to determining the random value has a first relationship with the setting value, and
   determining the first electronic device is not a seed device in response to determining the random value has a second relationship with the setting value, the second relationship being different than the first relationship.

14. The first electronic device of claim 13, wherein the one or more processors are configured to execute the computer-executable instructions such that the one or more processors are configured to,
play back the received low quality live stream data in response to a user selection on the low quality channel; and
suspend the sharing of the received low quality live stream data.

15. The first electronic device of claim 13, wherein the one or more processors are configured to execute the computer-executable instructions such that the one or more processors are configured to receive pieces of the low quality live stream data specified through a streaming sliding window using the streaming sliding window for specifying continuous pieces to be downloaded or played back among pieces that constitute live stream data.

16. The first electronic device of claim 15, wherein the one or more processors are configured to execute the computer-executable instructions such that the one or more processors are configured such that,
the streaming sliding window is divided into a plurality of areas, and
the receiving low quality live stream data includes,
   receiving pieces specified on a first area among the plurality of areas from a peer electronic device through a peer-to-peer (P2P) scheme.

17. The first electronic device of claim 16, wherein the one or more processors are configured to execute the computer-executable instructions such that the one or more processors are configured such that,
the receiving low quality live stream data includes,
   receiving pieces specified using a second area among the plurality of areas from a server through a streaming scheme, and
the second area is an area for specifying pieces corresponding to latest live stream data compared to other areas among pieces specified through the streaming sliding window.

* * * * *